United States Patent [19]
Doolin et al.

[11] Patent Number: 5,209,429
[45] Date of Patent: * May 11, 1993

[54] HELICOPTER WITH RETRACTABLE ROTOR FOR TRANSPORT

[75] Inventors: Leonard J. Doolin, Southbury; Thomas J. Toner, Milford, both of Conn.

[73] Assignee: United Technologies Corporation, Hartford, Conn.

[*] Notice: The portion of the term of this patent subsequent to Sep. 22, 2009 has been disclaimed.

[21] Appl. No.: 701,256

[22] Filed: May 16, 1991

[51] Int. Cl.5 .............................................. B64C 27/32
[52] U.S. Cl. ................... 244/17.11; 244/7 R; 416/142
[58] Field of Search ................. 244/7 R, 17.11, 17.27; 416/142, 149, 150, 114

[56] References Cited

U.S. PATENT DOCUMENTS

| | | | |
|---|---|---|---|
| 2,792,189 | 5/1957 | Altemus | 244/7 R |
| 2,981,339 | 4/1961 | Kaplan | 416/142 |
| 3,050,277 | 8/1962 | Katzenberger et al. | 244/7 R |
| 3,912,199 | 10/1975 | Seibel et al. | 416/142 X |
| 3,972,491 | 8/1976 | Ferris et al. | 244/17.27 |
| 4,131,392 | 12/1978 | Barzda | 416/142 |

*Primary Examiner*—Robert J. Oberleitner
*Assistant Examiner*—Carla Mattix

[57] ABSTRACT

A helicopter with a retractable rotor for transport wherein the rotor and its blades, the swashplate, the pitch change rods and support mast are lowered or raised in unison by the hydraulic flight control servos as commanded by the helicopter computerized flight control when being commanded by special rotor retraction-/extension software.

16 Claims, 9 Drawing Sheets

NORMAL FLIGHT MODE
FIG. 3

ROTOR RETRACTION MODE
FIG. 4

HELICOPTER WITH RETRACTABLE ROTOR FOR TRANSPORT

This invention was made with Government support under Contract DAAJ09-89-C-A002 awarded by the Department of the Army. The Government has certain rights in this invention.

This application contains similar material to an application filed on May 16, 1991 identified as U.S. Pat. No. 5,149,013 entitled "Retractable Helicopter Rotor" and invented by R. D. Costanzo et al.

TECHNICAL FIELD

This invention relates to helicopters and more particularly to helicopters having rotors which are movable between an extended, operable flight position in which they are a sufficient distance above the helicopter fuselage so that adequate clearance is maintained and the coaction therebetween does not establish vibration and aerodynamic drag, and a retracted position close to the fuselage in which the helicopter is transportable within a vehicle, such as a larger aircraft, an aircraft carrier, or a land vehicle.

BACKGROUND OF THE INVENTION

In the helicopter field, there have been retractable helicopter rotors, however, these prior art constructions added substantial weight to the helicopter and required substantial disassembly of parts to move the helicopter rotor from its extended position to its retracted position, and substantial assembly work to move the helicopter from its retracted position to its extended position. The prior art also required some external means for raising and lowering the rotor, such as a crane. U.S. Pat. No. 3,972,491 granted on Aug. 3, 1976 to Donald L. Ferris et al. discloses a two-position main rotor wherein the rotor is supported for rotation about an axis by an extension shaft which is, in turn, supported from the main rotor drive shaft which is, in turn, supported from the helicopter fuselage.

In the flight mode of operation, the extension shaft is connected at one end to the main rotor hub via a first series of fasteners and connected at the other end to the main rotor shaft by a second series of fasteners. As such, the configuration taught by Ferris et al. requires the disengagement of both upper and lower fasteners to move the rotor from its extended to its retracted position and reengagement of those fasteners to move the rotor from its retracted to its extended position. Further, these fasteners and their associated hardware impose weight penalties upon the helicopter. The Ferris et al. construction also requires connection and disconnection of the helicopter pitch change rods.

To put the Ferris et al. construction back into flight mode, it is not only necessary to reassemble all of the parts disassembled during the operation of retracting the rotor, but also reconnecting the pitch change rods and flying dedicated flights to re-establish rotor track and balance.

DISCLOSURE OF THE INVENTION

Therefore, it is an object of this invention to provide a construction in which the helicopter rotor is movable between an extended, flight operational position and a retracted, transport or stowage position which requires no additional hardware which would impose a weight penalty upon the helicopter, and in which the rotor, swashplate and pitch change rods are moved as a unit so that disconnection, reconnection, and calibration of the pitch change rods is not necessary.

It is an important object of this invention to effect rotor extension and retraction utilizing onboard hydraulic power, the helicopter flight control actuators, and software built into the helicopter flight control computers to control the action of raising and lowering the rotor. This approach eliminates the need for certain ground support equipment, such as a crane.

It is still a further object of this invention to teach such a helicopter whose rotor is retracted or extended using the hydraulic flight control actuators to raise and lower the rotor, and using the computerized helicopter flight control to control the action of the hydraulic flight control actuators during the rotor raising and lowering operation.

It is still a further object of this invention to teach such a helicopter which when in the rotor retracting or extending mode utilizes ground support equipment to connect the rotor and its blades to the swashplate to prevent rotor rotation and to cause the rotor and its blades, the pitch change rods and the swashplate to move in unison. This ground support equipment rigidly connects the rotor to the swashplate which allows the flight control actuators to raise and lower the rotor.

It is a further object of this invention that when the helicopter is in its rotor retraction or extension mode to utilize ground support equipment which will pilot the rotor support mast, and thereby permit the extension and the retraction of the rotor on rough terrain and in inclement weather.

It is still a further object of this invention to teach such a retractable helicopter rotor which permits rotor retraction and extension with minor disassembly and minimum weight impact.

It is still a further object of this invention to teach such a helicopter that when the rotor is in its retraction or extension mode the helicopter flight control is programmed to operate independently of the normal flight mode parameters and restraints and to cause the flight control actuators to fully extend and fully retract in unison causing the swashplate, with rotor, blades and pitch change rods connected thereto, to move through a swashplate collective pitch motion which exceeds the normal motion for the helicopter flight mode of operation but is within the total stroke capability of the actuators, and which accommodates lowering the rotor from its extended position the desired distance.

It is still a further object of this invention to teach such a helicopter in which, when in the rotor retraction/extension mode, the helicopter flight control cannot be actuated to lower the rotor or raise the rotor until the control receives signals from appropriate signal generators showing that the aircraft engines are stopped, that the aircraft rotor is stopped, that the aircraft gust lock is engaged, and that the aircraft hydraulic pressure is up adequately.

It is still a further object of this invention to teach such a helicopter with a retractable rotor in which a fly-by-wire or fly-by-light system is used which eliminates the mechanical mixing and permits the hydraulic flight control servos to fully extend and fully retract in unison.

It is still a further object of this invention to teach such a helicopter with a retractable rotor in which the helicopter flight control computer utilizes a B-I-T (Built-In-Test) type of software to control the helicopter flight control during the rotor extending and retracting mode, which is separate and distinct from the software used to control the helicopter in flight mode so that it in no way interferes with flight operation.

It is still a further object of this invention to teach such a retractable helicopter rotor in which the helicopter rotor with its blades, the pitch change rods and the swashplate are both retracted and extended in unison thereby avoiding the time delay which any type of disassembly between these parts would require and any calibration of the parts once assembled would require.

It is a further object of this invention to provide a retractable helicopter rotor wherein the helicopter rotor mount facilitates retraction and extension, reacts vertical lift loads through a structural interface, and reduces weight penalties. Our invention utilizes a single interface for connecting the rotor hub to its support mechanism and loads the fastener connection at that interface in compression, and reacts lift loads through a shoulder interface.

It is still a further object of this invention to teach such a retractable helicopter rotor which reduces the number and mass of structural interfaces and enhances the structural efficiency resulting in reduced weight and improved reliability.

It is still a further object of this invention to teach such a retractable helicopter rotor in which the support structure for the helicopter rotor may perform a pilot function as the rotor and swashplate mechanisms are retracted and extended in unison.

It is still a further object of this invention to teach such a retractable helicopter rotor in which the support connection between the helicopter fuselage and the helicopter rotor support mast consists of overlapping flanges which are concentric about and extend substantially perpendicular to the rotor axis of rotation, with the ring flange which is attached to the rotor mast positioned inwardly of the ring flange which is attached to the fuselage, and in which the connection therebetween is made by a series of bolts which, together with the flanges, are loaded in compression due to rotor lift experienced during the flight operation of the helicopter. The flanges so arranged permitting the telescoping lowering of the support mast within the fuselage structure.

Other objects, features and advantages of the invention will become apparent in light of the following description thereof.

BEST MODE FOR CARRYING OUT THE INVENTION

Figure 1:
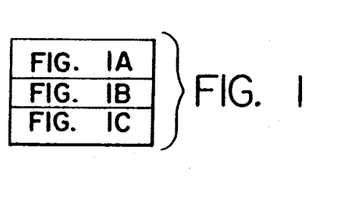
FIG. 1, which is shown on three pages as FIGS. 1A, 1B and 1C, is a side view of our retractable helicopter rotor, partially broken away and partially in cross-section, for purposes of illustration.
Figure 1A:
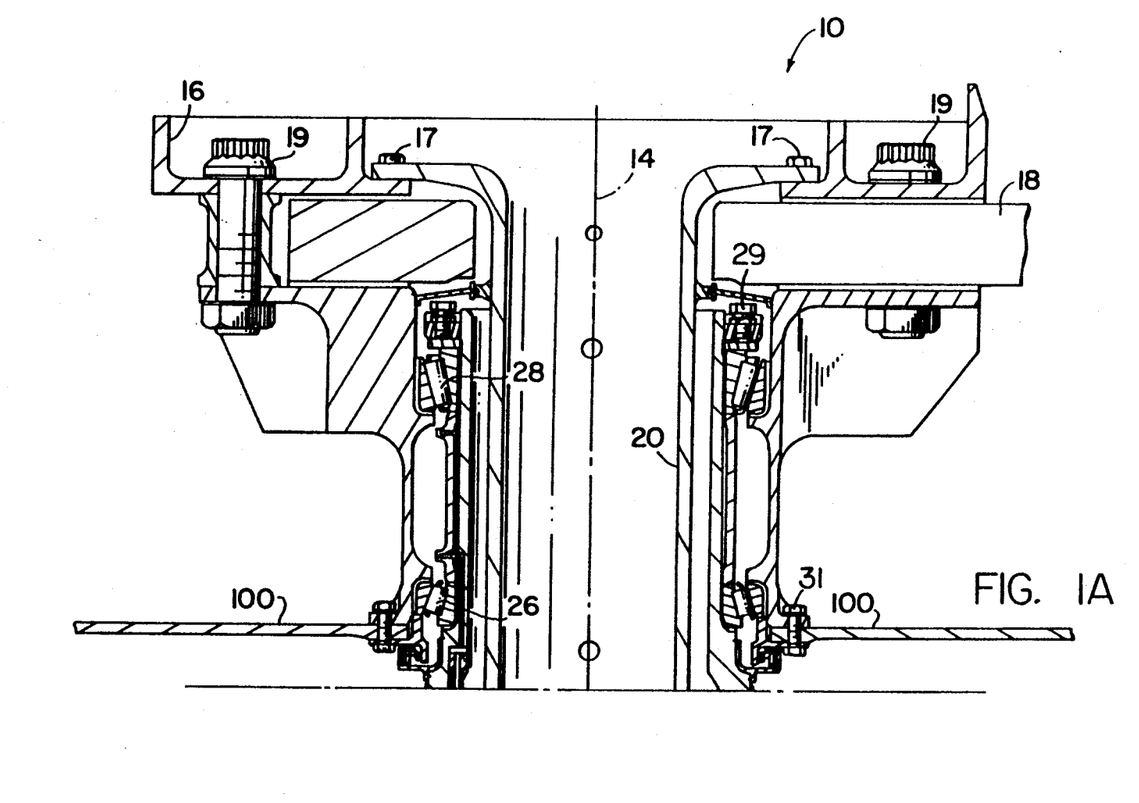
Figure 1B:
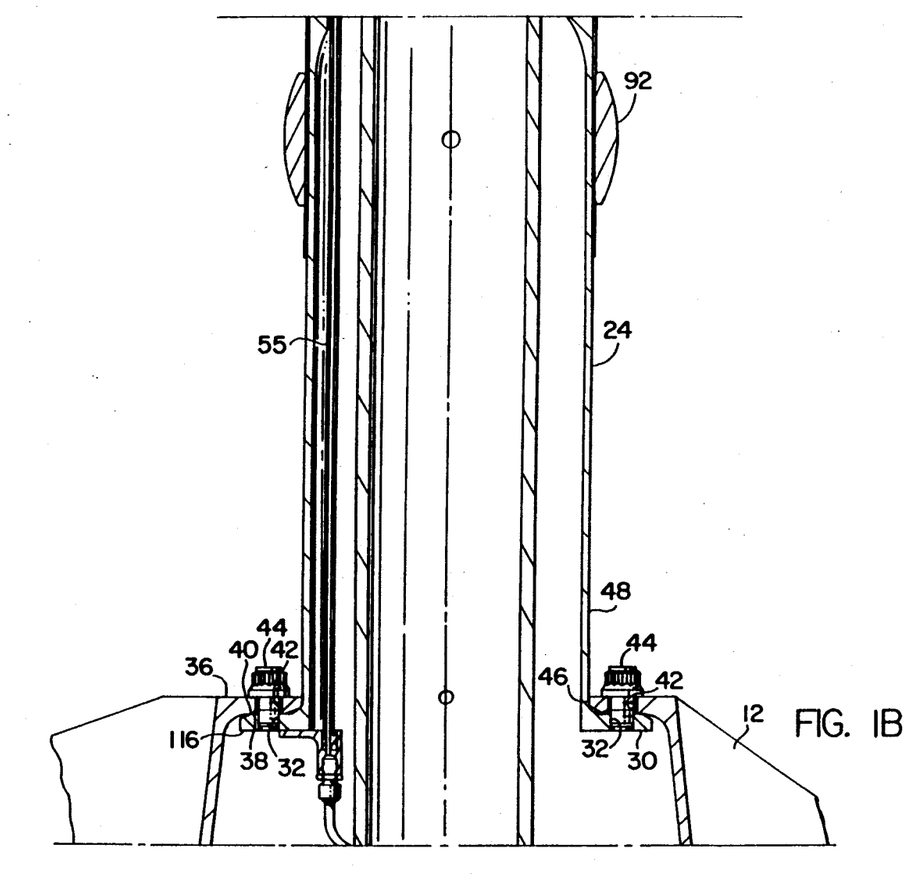
Figure 1C:
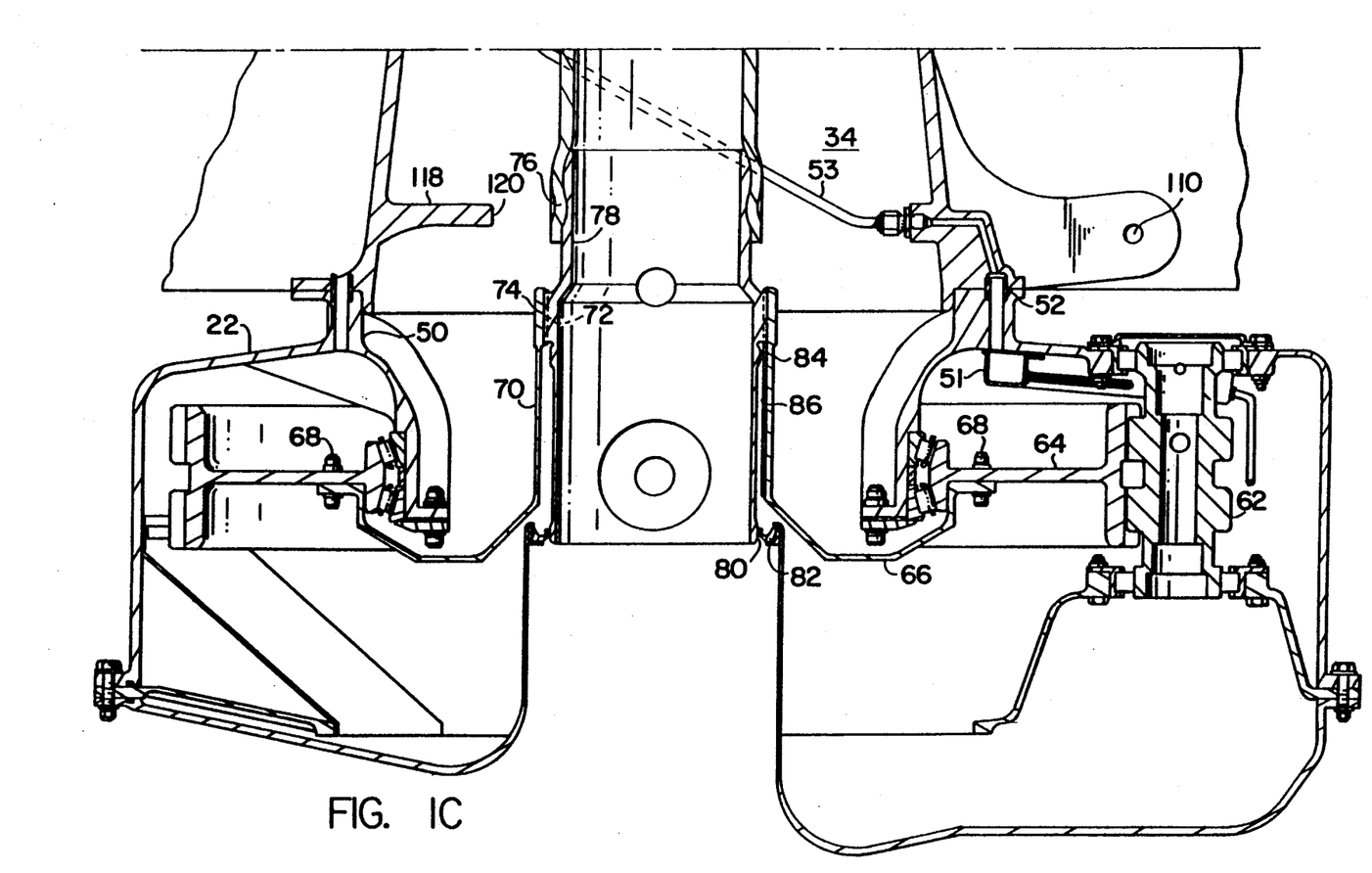

Referring to FIG. 1, we see helicopter rotor 10 and mast assembly which are supported from fuselage support platform 12 for rotation about axis of rotation 14. Helicopter rotor 10 comprises rotor hub 16 which carries in conventional fashion a plurality of radially extending blades 18 which are supported therefrom for rotation therewith and for lead/lag, flapping and pitch change motion with respect thereto. Blades 18 are supported from hub 16 by connecting bolts 19. Rotor 10 is driven in rotation by rotor drive shaft 20, which is connected to and is driven by engine driven transmission 22 in a fashion to be described hereinafter. Rotor drive shaft 20 is circular in cross-section, generally cylindrical in shape, and concentric about axis 14.

Rotor mast or standpipe 24, which is circular in cross-section, cylindrical in shape, and concentric about axis 14, is supported from support platform 12 at its axially inner or lower end and connects to rotor hub 16 through preload bearing 26 and main thrust bearing 28 and main mast nuts 29 and 31.

The axially inner or lower end of mast 24 terminates in ring flange 30 which is concentric about axis 14 and extends in a direction substantially perpendicular thereto. Ring flange 30 has a circumferential array of threaded bolt holes 32 extending therethrough in parallel relationship to axis 14.

While bearings 26 and 28 could be lubricated by grease packings, we prefer to bring oil from transmission 22 through manifold 51 and flexible tubing 53 into transfer tube 55, which carries the lubricant to both of these bearings 26 and 28.

Mast 24 is fixedly supported from support platform 12, which is in turn supported from the helicopter fuselage. Support platform 12 defines cavity 34 which communicates with the interior of the housing of transmission 22 and rotor drive shaft 20. At its axially outer end, support platform 12 terminates in ring flange 36, which is concentric about axis 14 and extends substantially perpendicular thereto, and has an axially inner flat surface 38, which matingly engages axially outer flat surface 40 of flange 30 in flush relationship. Flange 36 has a circumferential array of bolt holes 42 therein, which align with bolt holes 32 of flange 30 and receive connecting bolts 44 to join flanges 30 and 36 and thereby support mast 24 from support platform 12.

It is an important feature of our invention that with this construction, the lift loads imposed by the rotor lift forces acting upon support platform 12 are across the shoulder interface between flange surfaces 38 and 40.

Figure 2:
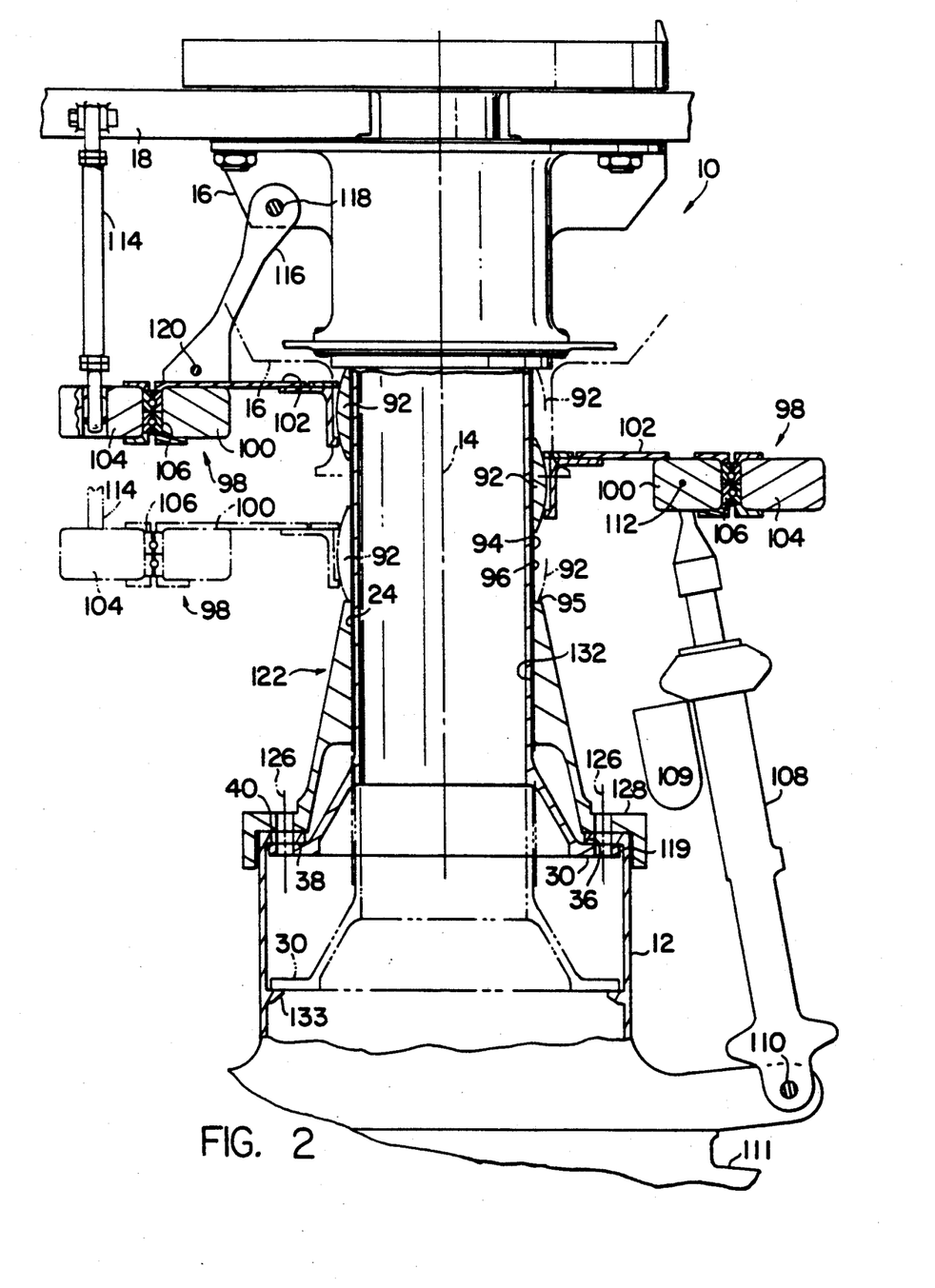
FIG. 2 is a side view, partially in cross-section and with parts removed to better illustrate the preferred embodiment of our invention.

It is also a feature of this invention that the minimum diameter surface 46 of flange 36 may engage pilot diameter 48 of mast 24 in close relationship so that support 12 serves to pilot mast 24 concentrically about axis 14 as the helicopter rotor moves between its extended, flight operational position and its retracted position shown in FIG. 2. In our preferred embodiment shown in FIG. 2, we prefer to have a gap 119 between the inner wall of support member 12 and flange 30 so as to prevent chafing or fretting therebetween.

The housing 50 of transmission 22 is mounted below the support platform 12, retained by a series of bolts 52.

Figure 7:
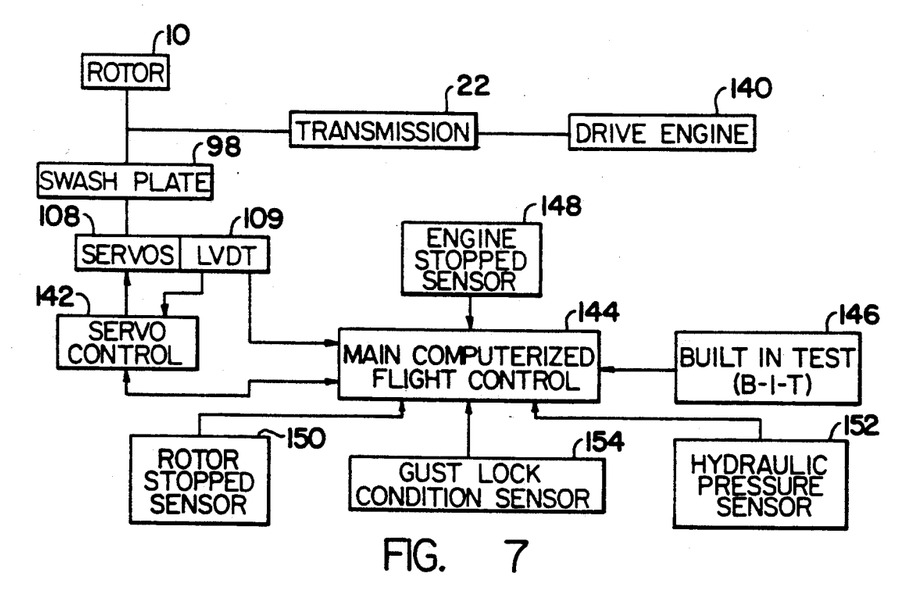
FIG. 7 is a diagrammatic representation of the helicopter flight control and its signal sensors used in control of the operation of the helicopter rotor during the rotor retraction/extension mode of operation.

As stated earlier, rotor drive shaft 20 and, hence, rotor 10 is driven in rotation about axis 14 by transmission 20, which is in turn driven by an engine, shown diagrammatically as 140 in FIG. 7.

As best shown in FIG. 1, an engine (not shown) drives input gear 62 which, in turn, drives third stage bullgear 64 about axis 14. Output quill 66 is connected to bullgear 64 by connecting bolts 68 for rotation therewith about axis 14. Output quill 66 includes cylindrical section 70, which is of circular cross-section and concentric about axis 14 and extends therealong terminating at axially outer end in a circumferential array of axially extending splines 72. Splines 72 matingly engage a circumferential array of splines 74, which are carried by rotor drive shaft 20 near its inner end so as to be integrally connected thereto or, as shown in FIG. 1, to be connected as a separate piece 78 to drive shaft 20 through connection 76, which is an overwrapped composite-to-metal joint.

It will be noted that drive shaft 20, or the connection 78 thereto, extends axially inwardly from connection 76 and defines a circumferential array of axially extending splines 74 which matingly engage splines 72 of quill 66 when rotor 10 is extended, and terminates in raised cylindrical surface 80, which engages ring or lip seal 82 when rotor 10 is in its extended flight position so as to form a seal between the interior of transmission housing 50 and cavity 34 within support platform 12. Drive shaft 20, or attachment 78 thereto, also includes raised cylindrical surface 84, which serves to engage seal 82 when the rotor is in its retracted position so that seal 82 serves as a seal between the transmission housing and the interior of support platform 12 when the rotor is in both its extended and retracted positions. It should be noted, however, that there is no contact between seal 82 and raised members 80 and 84 during the rotor extension or retraction operation so that the seal is not imposing friction loads which would impede rotor motion.

It will therefore be seen that engine driven transmission 22, due to the spline connection between output quill 66 and rotor drive shaft 20, or rotor drive shaft attachment 78, serves to drive rotor drive shaft 20 and, hence, rotor 10 in rotation about axis of rotation 14 at a reduced speed from that imparted to transmission 22 by first stage input gear 62.

It is important to note that output quill 66 also includes at least one, and preferably about three axially extending alignment splines 86, which extend axially along and for the full length of cylindrical portion 70 of quill 66, so that splines 74 of drive shaft 20, or attachment 78 thereto, remain in engagement with axial alignment splines 86 at all times during the rotor retraction or extension operation. This avoids the necessity for realigning the rotor with the transmission, which would be the case if splines 86 were not continuously performing their rotor-to-transmission alignment retention function.

FIG. 2, which is partially shown in cross-section and with parts removed for purposes of clarity, illustrates our preferred embodiment. FIG. 2, illustrates on the right hand side thereof hardware positions which would prevail during flight regime or mode, while on the left hand side, the hardware is illustrated in the positions it assumes when the rotor is in the retract/extend mode. As shown in FIG. 2, uniball or spherical bearing 92 envelops the cylindrical outer surface 94 of mast 24, and has friction reducing liner 96 positioned between uniball 92 and the outer surface of mast 24. Uniball 92 forms part of swashplate assembly 98, which consists of inner stationary swashplate ring 100, which is supported from spherical bearing 92 by support member 102, and which in turn supports outer rotating swashplate ring 104 through bearing 106, so that ring 104 is free to rotate with rotor 16 with respect to ring 100. A conventional scissors connects ring 104 to rotor 16.

Uniball 92 is free to move axially along mast 24 and axis 14 centering the swashplate assembly with respect to axis 14. Further, in conventional fashion, in view of the spherical nature of uniball bearing 92, the swashplate 98 can tilt with respect to axis 14 and mast 24.

In normal flight operation, a plurality of, and at least three, hydraulic flight control servos or actuators 108 are positioned in circumferential array about mast 24 and are pivotally connected at 110 to transmission support platform 12 or another fixed support from fuselage 111 and are pivotally connected at 112 to inner ring 100. Accordingly, when all flight actuators 108 extend uniformly, swashplate 98 moves axially along axis 14. This movement of swashplate 98, causes pitch change rods 114, which are located in circumferential array about axis 14, and each pivotally connected to rotating ring 104 and to a helicopter blade 18, to move therewith and thereby cause the pitch of the blades 18 to change collectively. Similarly, when flight control actuators 108 are actuated so that swashplate 98 is caused to tilt about axis 14, pitch change rods 114 cause the blades to change pitch cyclically.

Figure 3:
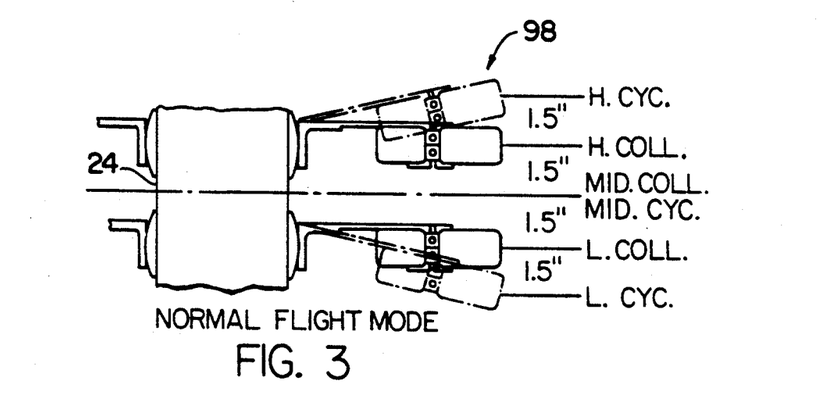
FIG. 3 is a diagrammatic representation of the collective and cyclic pitch motions of a helicopter rotor swashplate during normal flight mode of operation.

A typical embodiment could be described as follows. During flight mode, swashplate 98 moves axially along axis 14 to effect collective pitch change a total of three inches and is restrained by the flight control from moving therebeyond. We found, however, that this three inches of collective motion of swashplate 98 is an insufficient distance for rotor 10 to retract, since six inches of retraction is necessary. We have determined that hydraulic flight actuators 108 are capable of six inches of motion as illustrated in FIG. 3, which shows swashplate 98 in the normal flight mode of operation. It will be noted by viewing FIG. 3 that when the swashplate moves from its mid-collective position illustrated on the right hand side of FIG. 2, to its high collective position, shown in FIG. 3, it has moved a total of 1.5 inches. However, because when the swashplate is in its high collective position, it is also necessary to be able to impose cyclic pitch variations upon the blades of rotor 10, swashplate 98 must pivot beyond the high collective pitch position shown in FIG. 3 to the high cyclic pitch position shown in FIG. 3. This constitutes a total motion of three inches above the mid-collective position. Since similar action must be taken when the swashplate goes to the low collective position and the low cyclic positions shown in FIG. 3, a total of six inches of motion is required and is available from the hydraulic flight actuators 108. It will therefore be seen that in this typical embodiment, twice the swashplate axial motion is available for rotor retraction than that available in flight.

Figure 4:
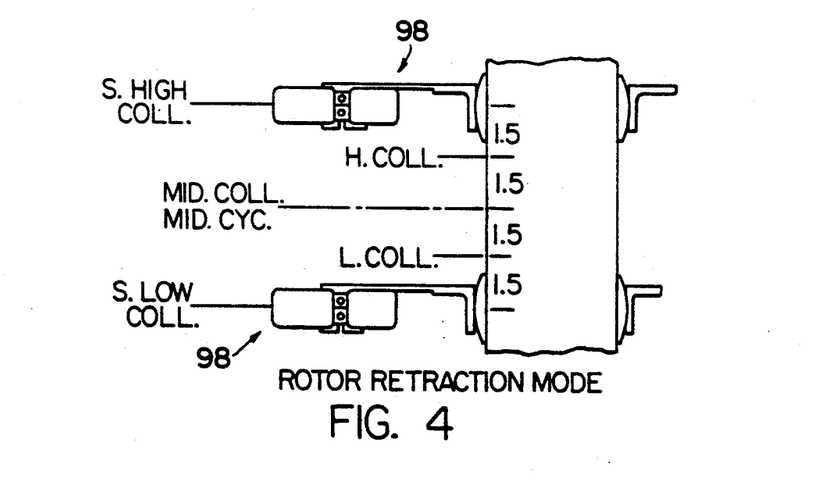
FIG. 4 is a diagrammatic representation of the collective pitch motion of a helicopter rotor swashplate during rotor retraction/extension mode of operation.

We, therefore, determined that since, as shown in FIG. 4, when the helicopter rotor is in its retraction/extension mode of operation, flight servos 108 are capable of moving swashplate 98 collectively a total of six inches, the required amount of rotor retraction and extension motion desired. It will be noted by viewing FIG. 4 that when swashplate 98 is in a position which we call the super high collective position, it is a full three inches above its mid-collective position and mid-cyclic position and when it is in its super low collective position, shown in FIG. 4, it is a total of three inches below the mid-collective and mid-cyclic positions, thereby providing a total motion of six inches of collective motion of swashplate 98 by the actuation of flight control actuators 108.

Again referring to FIG. 2, and in particular the left hand side thereof, we see swashplate 98 in its extended or super high collective position, as well as in its retracted/compressed or super low position, and that swashplate 98 travels a total of six inches along axis 14 in moving between its extended and compressed or retracted positions.

Figure 5:
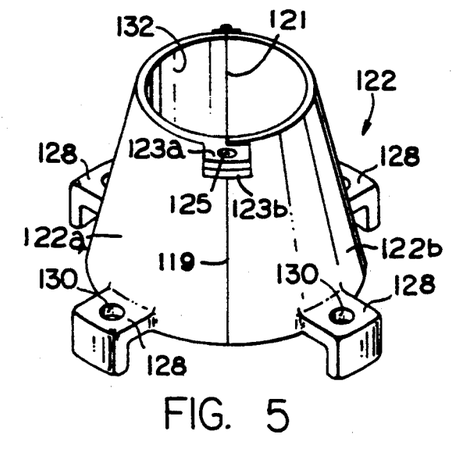
FIG. 5 is a perspective showing of the ground support pilot used in the rotor retraction/extension mode of operation.

Accordingly, to cause rotor 10 to move from its extended position when in the rotor retraction/extension mode, the operator utilizes the computerized flight control to cause flight control actuators 108 to extend simultaneously and in unison to move swashplate 98 to its FIG. 2 extended position. With swashplate 98 in this extended position, at least two ground support links 116 are each connected to rotor 16 at connection 118 and to fixed swashplate ring 100 at connection 120 so as to prevent rotor 16 from rotating about axis of rotation 14, and so as to cause rotor 16 with blades 18, swashplate 98 and pitch control rods 114 to move in unison as a unit thereafter. With links 116, or their equivalent, which could be a split conical connection between ring 100 and rotor hub 16 so connected, we then remove some of the bolts 44 shown in FIG. 1 which are presently connecting rotor support mast 24 to support structure 12, which is in turn supported from fuselage 111. Only a sufficient number of bolts 44 are removed to permit the attachment of split ground support pilot member 122 to be positioned around mast 24. Pilot 122 includes circumferential spaced flange 128 at one end thereof which has a plurality of bolt holes having axes 126 which define a bolt circle which is concentric about axis 14 so as to permit pilot 122 to be connected to support structure 12. When all of bolts 44 are removed between flanges 30 and 36, the full weight of the rotor and its blades, the pitch change rods 14 and the swashplate 98 are being supported solely by the flight control actuators 108. Pilot 122 is fabricated as shown in FIG. 5 to be split at its opposite sides along lines 119 and 121 to form two halves 122a and 122b thereof and to have laterally projecting flanges, such as 128, projecting therefrom and including bolt holes 130 extending therethrough to align along axes 126 of FIG. 2 with the bolt holes of flange 36 to permit bolt connection between flange 36 of support member 12 and the pilot member 122. As shown in FIG. 5, lug 123a, which is attached to pilot half 122a, connects to lug 123b, which is attached to pilot half 122b, by means of a bolt (not shown passing through aligned holes 235 and 123a and 123b. Additional lugs, such as 123a and 123b may be positioned along lines 119 and 121. It will be noted, as best shown in FIG. 2, pilot member 122 includes a sleeve shaped end having a cylindrical inner surface 132 which matingly engages the cylindrical outer surface 94 of mast 24, or possibly liner 96 so as to serve as a pilot for mast 24 with respect to any motion which mast 24 would experience along axis 14.

It will be evident to those skilled in the art that pilot 122 could be flight equipment, and flange 128 could be circumferential.

It will therefore be seen that, after flight control actuators 108 move swashplate 98 to its extended or super high collective position, and after links 116 have been attached, and after pilot 122 has been installed, and all bolts 44 have been removed, the full weight of the rotor blades, swashplate 98 and the pitch change rods 114 will be supported by the flight control actuators 108.

The flight control actuators 108 are then caused to move in unison to their retracted or compressed position, thereby causing swashplate 98 and the swashplate-rotor-blade-pitch change rod unit to be lowered a full six inches to the swashplate compressed position shown in phantom in FIG. 2.

It will be noted by viewing FIG. 2 that when the swashplate-pitch change rod-rotor assembly is in its fully retracted position, flange 30 is bearing against positive stop ring 133, which projects inwardly and preferably extends circumferentially around support housing 12.

The use of links 116 and pilot 122 is particularly important when the helicopter is sitting on rough terrain, or the rotor retraction/extension operation is taking place in inclement weather.

It is an important feature of our invention that the flight control actuators 108 are to be controlled by the aircraft computer flight control both when the rotor is in its retraction/extension mode and in its flight mode. The computer is provided with B-I-T type software which permits precise control of the swashplate position during the rotor lowering and raising mode, but which does not interfere in any way with the operation of the flight control when the helicopter is in the flight mode. Built-in-Test software is used to perform ground checks of the flight control system. A result of performing the check is the displacement of the servos and swashplate to verify their ability to operate in flight.

Figure 6A:
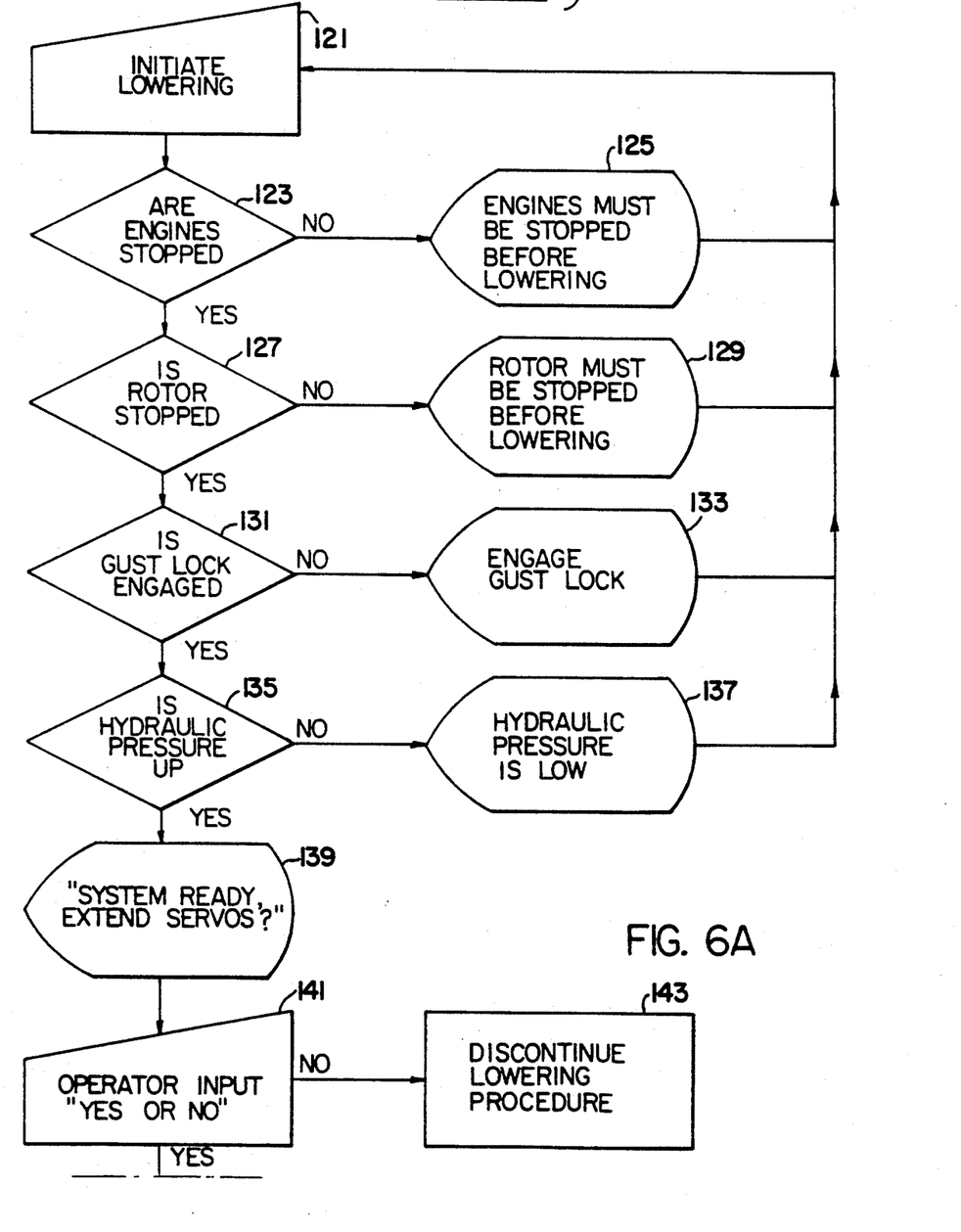
FIGS. 6A, 6B and 6C is an algorithm from which the computer software is made for use with the computer portion of the helicopter flight control during the rotor retraction/extension mode of operation.
Figure 6B:
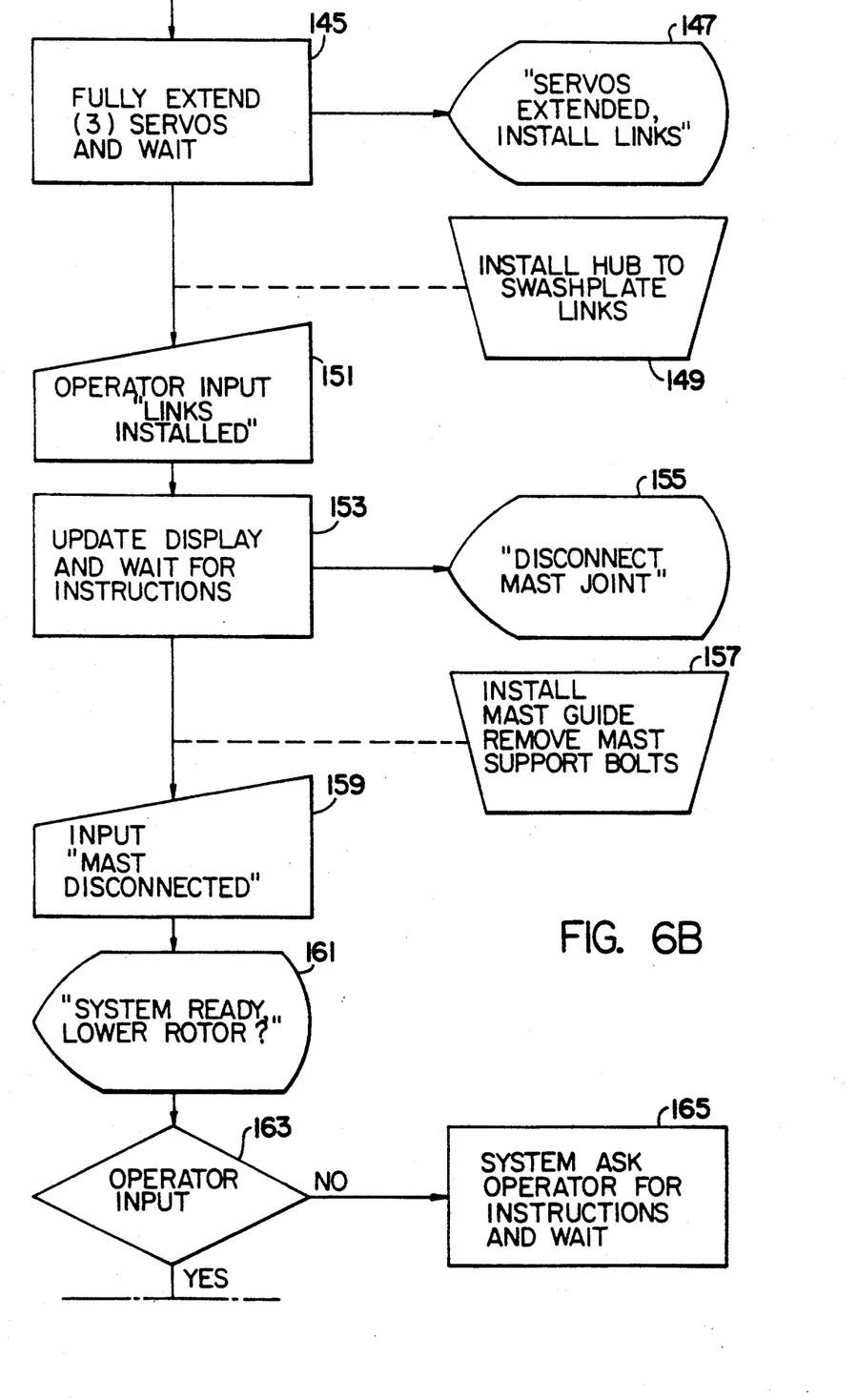
Figure 6C:
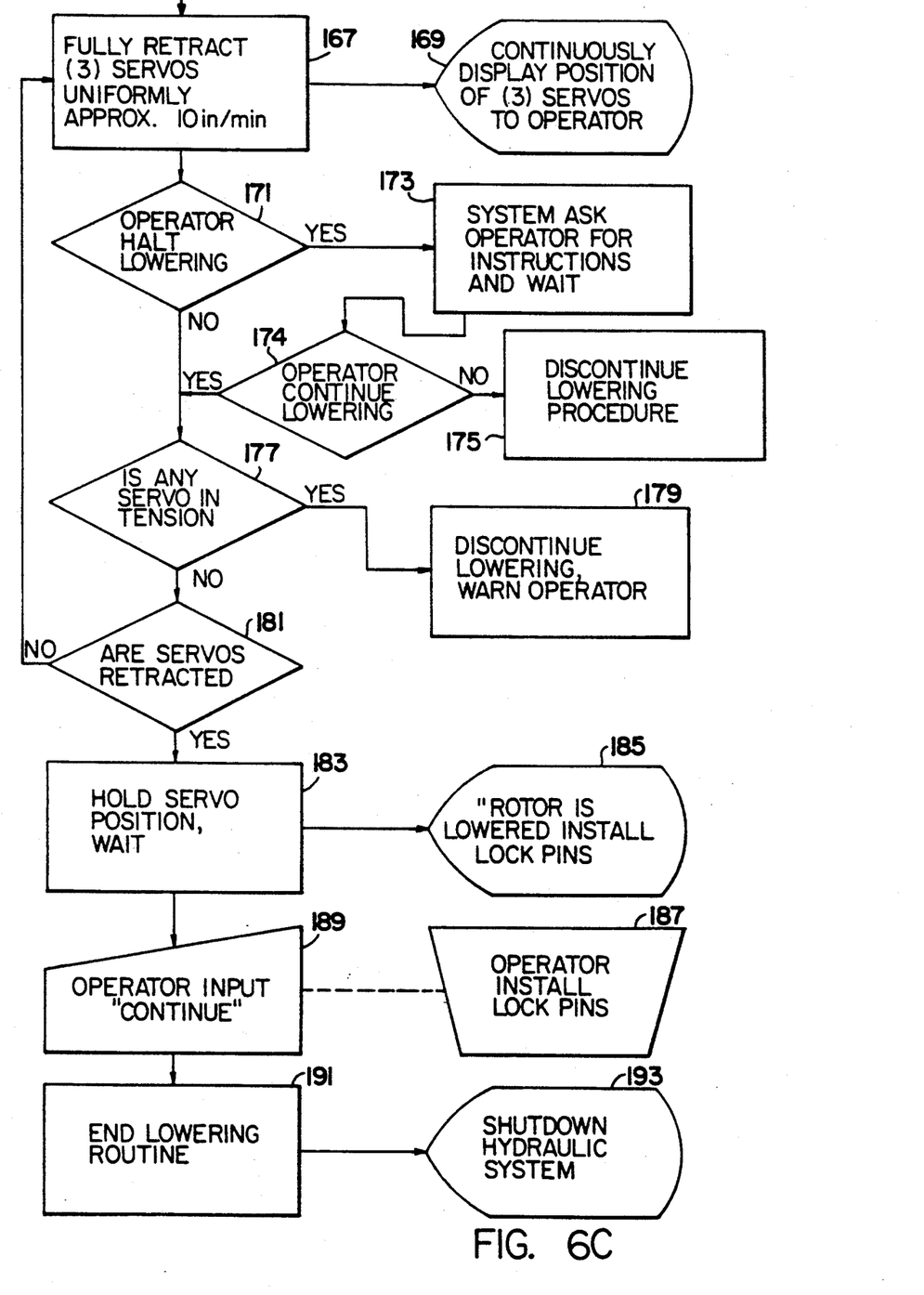

In view of the fact that the retraction and extension of the helicopter rotor from the fuselage is a complicated procedure, and because of the expense of the helicopter parts involved, it is necessary to exercise all possible precautions during the rotor retraction or rotor extension operation. This is accomplished as shown in FIGS. 6A, 6B and 6C, which is an algorithm from which the B-I-T software for the computerized flight control is fabricated for use during the rotor retraction-extension mode. In the algorithm represented in FIGS. 6A, B and C, the top figure in FIG. 6A marked "Initiate Lowering" represents a manual input to the controller computer, the diamond represents a decision point, the bulbous ended figure represents a display to the operator by the flight control computer, the rectangular figure represents a process performed by the computer and flight control system, and the trapezoid represents a manual operation performed by the operator or ground crew.

As shown in FIG. 6A through 6C, when the operator initiates the retraction or lowering signal to the computer at manual input 121, that signal must first pass through decision point 123 which has received a signal as to whether the engines have stopped rotating. If the engines have not stopped rotating, that signal is sent through display 125 back to the operator. If the engines have stopped rotating, that signal is sent on to the next decision point 127 which has received a signal as to whether the helicopter rotor has stopped rotating. If the helicopter rotor has not stopped rotating, that message is sent through display 129 back to the operator. If the rotor has stopped rotating, the "Initiate Lowering"

signal is passed on to the next decision point 131, which receives a signal as to whether the helicopter gust lock is engaged. The gust lock mechanically locks the drive train including the rotor so that it cannot rotate or freewheel. This is accomplished any number of ways, but is frequently done by engaging one gear in the drive train with a locking pawl. If it is not engaged, the signal to engage the lock is sent through display 133 back to the operator. If it is engaged, the "Initiate Lowering" signal goes on to the next decision point 135 which receives a signal as to whether the hydraulic pressure for the system which is going to actuate the hydraulic flight control servos or actuators is up. If that hydraulic pressure is not up, that signal is sent through display 137 back to the operator. If it is up, then the operator receives the display at 139 indicating that the system is ready, and asking whether the servos are to be extended. If the operator's input at 141 in response to the question as to whether the servos are to be extended is in the negative, the lowering procedure is discontinued as shown at 143. If the operator input is in the affirmative, then the computer operated flight control operates to cause all flight control servos 108 to extend simultaneously to their full extended position and remain there as shown at 145. When the servos are in their fully extended position, the operator receives a display at 147 stating "Servos extended, install links". Hub-to-swashplate links 116, shown in FIG. 2, are then installed as shown at 149. With links 116 installed, the operator inputs at 151 "Links installed", in response to which the computer as shown at 153 provides a operator display at 155 "Disconnect mast joint". The mast joint between flanges 30 and 36 are then disconnected and pilot 122 is connected to support 12 as shown at 157 so as to pilot mast 24 during the rotor retraction motion along axis 14. The operator then inputs "Mast disconnected" at 159 which triggers a display at 161 which advises the operator that the system is ready and asks whether the rotor is to be lowered. If the operator's input at 163 is negative, the system asks for instructions and waits, as shown at 165. If the operator's input is affirmative, then as shown at 167 the computerized flight control causes all flight control servos to retract uniformly at a speed of about ten inches per minute while providing a continuous display at 169 as to the position of the servos to the operator. During this rotor retraction operation, the operator is constantly given the opportunity to stop the process at 171 by being asked should the lowering be halted. If his input is "yes", then at 173 the system halts the lowering, asks for instructions and waits. If his input at 174 is "no", the lowering procedure is discontinued as shown at 175. Diamond's 177 (servo in tension) and 181 (servo retracted) are diagnostics within the system that are constantly interrogated to be sure things are working properly. Once lowering starts the operator does not have to do anything, the system will stop itself when the rotor is fully lowered, the computer holds servo position and waits, as shown at 183, and the operator receives a display at 185 "Rotor is lowered. Install lock pins". The lock pins (not shown) mechanically retain the lowered assembly to prevent inadvertent movement or damage since the hydraulic system will no longer maintain the position once shut down. The lock pins, for example, could extend thru aligned holes in pilot 122 and mast 24 when the rotor is fully retracted. After the lock pins are manually installed, as shown at 187, the operator makes an input at 189 to continue and the lowering routine is completed by the computer, as shown at 191, and "Shut down hydraulic system" is displayed at 193.

The overall operation of our helicopter with a retractable rotor is shown in FIG. 7 in which drive engine 140, which is of conventional design, drives rotor 10 at a reduced speed through transmission 22. Swashplate 98 is caused to move and, hence, transmit pitch change signals to the rotor 10 through the actions of hydraulic flight control servos 108. Servo control 142 receives processed signals from main computerized flight control 144, which is basically a signal processor, and causes servos 108 to position swashplate 98 and, hence, rotor 10 as commanded by the processed signals being received from the flight control 144.

The main flight control 144 has B-I-T (Built-In-Test) software 146 associated therewith. The hardware 146 is produced to carry out the functions of the algorithm described earlier in connection with FIGS. 6A, 6B and 6C, and is operable only when the helicopter rotor is in the rotor retraction or extension mode. B-I-T software 146 is not in operation during helicopter flight operation. During the rotor retract or extend mode, flight control 144 receives signals from engine condition sensor 148 which indicates whether the engine 140 is stopped, from rotor condition indicator 150, which indicates whether the helicopter rotor 10 is stopped, from hydraulic pressure sensor 152, which indicates whether there is sufficient hydraulic pressure to perform the rotor retraction/extension operation, and also from gust lock condition sensor 154, which provides a signal advising whether or not the gust lock is engaged. The flight control 144 is programmed so that it does not send signals to the servo control to initiate the rotor retraction or extension operation until appropriate signals are received from sensors 148-152.

Each servo 108 has an LVDT, which means linear variable differential transformer, and is a velocity displacement transducer, associated therewith which serves to send feedback signals relative to servo positions back to the flight control 144, thereby assuring that all servos are operating in unison during the rotor extension and retraction mode of operation.

Further, our fly-by-wire or fly-by-light system eliminates mechanical mixing and serves to overrule the normal inputs and restraints placed upon the flight control 144 during the flight mode of operation so as to permit the servos to fully extend and fully retract during the rotor retraction/extension mode of operation. To appreciate the benefits of eliminating mechanical mixing, it should be understood that the in-flight control inputs from the pilot involve a collective stick, a cyclic stick and "rudder" pedals. In order to "convert" these inputs to real movements of the servos (main and tail rotor), a mechanical mixer is used. It is a complicated assembly of levers, bell cranks, rollers, cams and other mechanisms. A second function of the mixer is to limit extreme combinations of control input, for example, maximum collective and maximum cyclic simultaneously, and this is done by putting mechanical stops in the mixer. These mechanical stops would prevent attaining the super high or super low collective positions. By controlling rotor retraction electronically with a computer, the "electronic stops" can be by-passed by going into the B-I-T software.

It will, therefore, be seen that our retractable rotor actuating mechanism uses on-board hydraulic power, the helicopter flight control actuators 108, and software 146 built into the flight control computers to selectively control the raising and the lowering of the rotors.

When the helicopter is to be made ready for flight mode of operation, just the reverse procedure takes place. The control 144 causes the flight control actuators 108 to simultaneously raise the swashplate 98 and, hence, the rotor 10 to its extended position, at which time, bolts 44 shown in FIG. 1 are fastened in position, pilot 122 is removed and link pins 116 are removed, thereby placing the rotor in the flight operating mode. At the same time, the built-in-test software would be inactivated to put the main computerized flight control 144 back into its normal flight operation mode and condition.

Having thus described a typical embodiment of the invention, that which is claimed as new and desired to be secured by Letters Patent of the United States is:

1. In a helicopter having a rotor which is movable between an extended flight and a retracted stowed position for transport with respect to the fuselage, and having a support mast to support the rotor for rotation about an axis of rotation, support means extending from the fuselage, means connecting the support means to the support mast so as to fixedly support the rotor support mast from the fuselage during normal helicopter operation, a swashplate enveloping the support mast and movable both axially along the rotor axis of rotation and tiltably with respect thereto, pitch change rods pivotally connected to the swashplate and the rotor blades, hydraulic flight control servos pivotally supported from the fuselage and connected to the swashplate and actuatable to cause the swashplate to move axially along the support mast or tilt with respect thereto to move the pitch change rods so as to selectively effect blade pitch change collectively as the swashplate moves axially along the support mast and cyclically as the swashplate tilts with respect thereto, a method of lowering the helicopter rotor from its extended position to its retracted position without having to disassemble or disconnect the swashplate, the blade pitch rods, or the hydraulic servos comprising the steps of:
   a. actuating the hydraulic servos so as to cause the swashplate to extend to a high collective pitch position;
   b. mechanically connecting the rotor to the swashplate so positioned so that the rotor is restrained from rotating and so that the rotor and the swashplate and the pitch change rods are movable by the flight control servos as a unit along the rotor axis of rotation;
   c. positioning a ground support pilot so as to envelop the support mast;
   d. connecting the ground support pilot to the support means;
   e. disconnecting the connecting means between the support mast and the support means; and
   f. causing the hydraulic servos to act in unison to move the swashplate, the rotor, and the pitch change rods as a unit from the rotor extended position to the rotor retracted position.

2. The method according to claim 1 wherein the helicopter includes a main flight control and including an additional step of utilizing the helicopter main flight control to actuate the hydraulic servos in unison to move the swashplate between an extended position and a retracted position both of which are outside of the swashplate collective pitch motion range experienced during flight mode.

3. The method according to claim 2 and including a rotor drive shaft positioned concentrically about the rotor axis of rotation and enveloped by the support mast, an engine for powering the rotor, and a transmission operatively connected between the engine and the rotor drive shaft so as to drive the rotor at a different speed than engine speed, and further including means connecting the transmission to the rotor drive shaft, an additional step of disconnecting the rotor drive shaft from the transmission before the hydraulic servos commence movement of the swashplate, the rotor and the pitch change rods as a unit from the rotor extended position to the rotor retracted position.

4. The method according to claim 3 including the additional steps of providing an engine stop signal, a rotor stop signal, a gust lock engaged signal, and a hydraulic pressure signal to the main flight control before commencing the rotor lowering operation.

5. In a helicopter having a rotor which is movable between an extended and a retracted position, and having a support mast positioned concentrically about the rotor axis of rotation to support the rotor for rotation about its axis of rotation, support means fixedly supporting the rotor support mast from the fuselage, a swashplate movable both axially along the support mast and tiltably with respect thereto, pitch change rods connecting between the swashplate and the rotor blades to vary the pitch thereof in response to swashplate motion, hydraulic servos pivotally supported from the fuselage and connected to the swashplate and actuatable to cause the swashplate to move axially along the support mast or tilt with respect thereto so as to selectively effect blade pitch change collectively as the swashplate moves axially along the support mast and cyclically as the swashplate tilts with respect thereto, a mechanical connection between the swashplate and the rotor to prevent rotor rotation and to cause the swashplate, pitch change rods and rotor to move axially in unison, a ground support pilot connected to said support means and enveloping said rotor mast so as to perform a piloting function as the rotor mast moves axially, a method of extending the helicopter rotor from its retracted position to its extending position without having to disassemble or disconnect the swashplate, the blade pitch rods or the hydraulic servos comprising the steps of:
   a. actuating the hydraulic servos in unison to move the swashplate, the pitch change rods and the rotor from the rotor's retracted position to its extended position;
   b. removing the ground support pilot from around the support mast;
   c. connecting the support mast to the support means; and
   d. removing the mechanical connection between the rotor and the swashplate to permit rotation of the rotor and relative motion between the rotor and the swashplate.

6. A helicopter having:
   a. a fuselage;
   b. a rotor projecting therefrom for rotation about an axis of rotation, said rotor comprising:
      1) a rotor hub mounted for rotation about the axis of rotation, and
      2) a plurality of blades connected to and extending radially outwardly from the rotor hub for rotation therewith;

c. a support mast positioned concentrically about the rotor axis of rotation, and having a cylindrical outer surface and operable to support said rotor for rotation;

d. a support member supported from the fuselage and operatively connected to the support mast to fixedly position the support mast concentrically about the rotor axis of rotation and so that the rotor is supported for rotation about the axis of rotation;

e. a swashplate including:
  1) a uniball bearing enveloping the support mast and supported therefrom,
  2) an inner ring supported from the uniball for axial motion therewith along the support mast and for tilting about the rotor axis of rotation, and
  3) an outer ring operatively supported from the inner ring so as to be rotatable with the rotor;

f. pitch change rods pivotally connected to the swashplate outer ring and to each blade so that as the swashplate moves axially along the rotor axis of rotation the blades are caused to change pitch collectively, and so that when the swashplate tilts about the uniball and the axis of rotation, the blades are caused to change pitch cyclically;

g. a plurality of hydraulic flight control servos positioned about the rotor mast and each pivotally connected to the fuselage and to the swashplate inner ring; and h. means to cause said hydraulic servos to be actuated in unison to cause said swashplate, pitch change rods and rotor to move in unison between an extended position in which the rotor is in flight mode of operation, and a retracted position in which the rotor is in a stowed mode.

7. A helicopter according to claim 6 including a main flight control computer operatively connected to control the actions of the hydraulic servos in both the helicopter flight mode and in a helicopter rotor retraction or extension mode.

8. A helicopter according to claim 7 wherein the helicopter includes a flight control and including means to cause said flight control to actuate said hydraulic actuators in unison during the helicopter rotor retraction or extension mode.

9. A helicopter according to claim 8 and including an engine supported by the fuselage and operatively connected to drive the rotor, a transmission positioned between the rotor and the engine and operable to permit the rotor to rotate at a speed less than engine speed, a rotor drive shaft of circular cross-section and concentric about the rotor axis of rotation and connected at one end to the rotor and at the other end to the transmission.

10. A helicopter according to claim 9 and including means to provide a rotor stopped signal, an engine stopped signal, a hydraulic pressure signal, and a gust lock condition signal to the flight control before the rotor can commence operating in the extension or retraction mode.

11. A helicopter in either a rotor retract or rotor extend mode comprising:
  a. a fuselage;
  b. a helicopter rotor extending from the fuselage and operable for rotation about an axis of rotation, the rotor including a rotor hub;
  c. a plurality of blades connected to and extending from the rotor hub for rotation therewith;

d. a support member enveloping the rotor axis of rotation and fixedly positioned from the fuselage;

e. a rotor support mast positioned concentrically about the axis of rotation and having a cylindrical outer surface;

f. means connecting the rotor support mast to the support member so that the support mast is fixedly positioned with respect to the fuselage;

g. means connecting the rotor support mast to the rotor hub so as to permit rotation of the rotor and its blades about its axis of rotation;

h. a swashplate positioned enveloping the rotor mast concentrically about the axis of the rotor and including:
  1) a spherical bearing engaging the rotor mast for axial motion therealong,
  2) an inner ring supported from the spherical bearing for axial motion therewith both axially along the rotor axis of rotation and for tilting motion with respect thereto, and
  3) an outer ring enveloping the inner ring and connected thereto through bearings which permit rotation of the outer ring with the helicopter rotor;

i. a circumferential array of pitch change rods pivotally connected to the swashplate outer ring and to the blades to effect collective blade pitch motion as the swashplate moves axially along the axis of rotation and blade cyclic pitch change as the swashplate tilts with respect to the axis of rotation;

j. restraining means connecting the swashplate to the rotor hub so as to prevent rotation of the rotor and so as to cause the rotor and its blades to move in unison with the swashplate and the pitch change rods during a rotor retraction operation;

k. a pilot member including:
  1) a base portion connected to the support member so as to be held in fixed position from the support member, and
  2) a sleeve portion closely enveloping the cylindrical outer surface of the rotor mast so as to perform a piloting function for the rotor mast when the hydraulic actuators move the swashplate, rotor, blades and pitch change rods as a unit between the rotor extended to the rotor retracted positions; and l. a circumferential array of hydraulic flight control actuators support from the fuselage and actuatable to move in unison to cause the swashplate, rotor hub and blades and pitch change rods to move as a unit between the rotor extended position and the rotor retracted position when the rotor mast is disconnected from the support member.

12. A helicopter according to claim 11 and including a fixed stop positioned in said support member and against which the rotor mast bears when the rotor is in its retracted position.

13. A helicopter according to claim 12 wherein the connecting means between the support member and the rotor support mast are abutting flanges arranged to permit the retraction and extension of the mast, and having a circumferential array of bolt holes extending therethrough and each having a flat surface lying in a plane perpendicular to the axis of rotation and abutting the corresponding surface of the other of said rotor support mast and said support member.

14. A helicopter according to claim 11 and including:

a. a computerized flight control positioned in the fuselage and operatively connected to control the operation of the hydraulic actuators when the helicopter is in the rotor retract or rotor extend mode;

b. means to provide an engine stopped signal, a rotor stopped signal, a gust lock engaged signal, and an hydraulic pressure-up signal to the computerized flight control; and c. means to cause the computerized flight control to simultaneously actuate the hydraulic actuators to move the swashplate, pitch change rod and rotor in unison smoothly between the rotor extended and rotor retracted position while constantly monitoring hydraulic actuator condition and performance.

15. A helicopter having:

a. a fuselage;

b. a rotor projecting therefrom for rotation about an axis of rotation, said rotor comprising:
   1) a rotor hub mounted for rotation about the axis of rotation, and
   2) a plurality of blades connected to and extending radially outwardly from the rotor hub for rotation therewith;

c. a support mast positioned concentrically about the rotor axis of rotation, and having a cylindrical outer surface and operable to support said rotor for rotation;

d. a support member supported from the fuselage and operatively connected to the support mast to fixedly position the support mast concentrically about the rotor axis of rotation and so that the rotor is supported for rotation about the axis of rotation;

e. a swashplate including:
   1) an inner ring supported from the support mast for axial motion there along and for tilting about the rotor axis of rotation, and
   2) an outer ring operatively supported from the inner ring so as to be rotatable with the rotor;

f. pitch change rods pivotally connected to the swashplate outer ring and to each blade so that as the swashplate moves axially along the rotor axis of rotation the blades are caused to change pitch collectively, and so that when the swashplate tilts about the axis of rotation, the blades are caused to change pitch cyclically;

g. a plurality of hydraulic flight control servos positioned about the rotor mast and each pivotally connected to the swashplate fixed ring; and h. means to cause said swashplate, pitch change rods and rotor to move in unison between an extended position in which the rotor is in a flight mode of operation, and a retracted position in which the rotor is in a stowed mode.

16. A helicopter according to claim 15 wherein said means is said flight control servos.

* * * * *

UNITED STATES PATENT AND TRADEMARK OFFICE
CERTIFICATE OF CORRECTION

PATENT NO. : 5,209,429
DATED : May 11, 1993
INVENTOR(S) : Leonard J. Doolin, et al It is certified that error appears in the above-identified patent and that said Letters Patent is hereby corrected as shown below:

Claim 4, column 12, line 14, after "including",
    delete "the"

Claim 11, column 14, line 18, before "motion",
    delete "axial"

Claim 11, column 14, line 49, "support" should read
    "supported"

Signed and Sealed this

Fourth Day of January, 1994

Attest:

BRUCE LEHMAN

*Attesting Officer*     *Commissioner of Patents and Trademarks*